US011032229B2

(12) United States Patent
Nesbitt

(10) Patent No.: US 11,032,229 B2
(45) Date of Patent: Jun. 8, 2021

(54) SYSTEM AND METHOD FOR VISUAL CLASSIFICATION OF EMAIL PARTICIPANTS

(71) Applicant: INTERNATIONAL BUSINESS MACHINES CORPORATION, Armonk, NY (US)

(72) Inventor: Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 14/815,060

(22) Filed: Jul. 31, 2015

(65) Prior Publication Data

US 2017/0034099 A1 Feb. 2, 2017

(51) Int. Cl.
*H04L 12/58* (2006.01)
*G06F 9/451* (2018.01)
*G06Q 10/10* (2012.01)

(52) U.S. Cl.
CPC .............. *H04L 51/22* (2013.01); *G06F 9/453* (2018.02); *G06Q 10/107* (2013.01); *H04L 51/14* (2013.01); *G06F 9/451* (2018.02); *H04L 51/28* (2013.01)

(58) Field of Classification Search
CPC ....... G06Q 10/107; H04L 51/22; H04L 51/14; H04L 51/28; G06F 9/453; G06F 9/451
See application file for complete search history.

(56) References Cited

U.S. PATENT DOCUMENTS

| 6,393,464 | B1 * | 5/2002 | Dieterman | ........... G06Q 10/107 709/206 |
| 7,328,241 | B2 * | 2/2008 | Ribak | .................. G06Q 10/107 709/204 |
| 7,506,026 | B1 * | 3/2009 | Lance | .................... G06Q 10/00 709/203 |
| 7,774,421 | B2 | 8/2010 | Dubovsky et al. | |
| 8,103,726 | B2 | 1/2012 | Stoddard et al. | |
| 8,239,463 | B2 | 8/2012 | Malik | |
| 8,307,038 | B2 | 11/2012 | Gillum et al. | |
| 8,892,672 | B1 * | 11/2014 | Rackliffe | ................ H04L 51/28 709/206 |
| 2002/0071546 | A1 * | 6/2002 | Brennan | ................. H04L 51/14 379/379 |
| 2002/0178228 | A1 | 11/2002 | Goldberg | |
| 2004/0078488 | A1 | 4/2004 | Patrick | |

(Continued)

FOREIGN PATENT DOCUMENTS

EP 1924039 B1 4/2010
JP 2005072672 A 3/2005

*Primary Examiner* — James T Tsai
(74) *Attorney, Agent, or Firm* — L. Jeffrey Kelly

(57) ABSTRACT

A method, computer program product, and computer system for generating, by a computing device, an electronic message. While authoring the electronic message, a contact shown in the electronic message may be identified that will receive the electronic message when the electronic message is sent. The contact may be associated with a classification based upon, at least in part, one or more attributes of the contact. A visual indication associated with the contact may be displayed based upon, at least in part, the classification of the contact, wherein the visual indication associated with the contact may be displayed while authoring the electronic message and before the electronic message is sent to the contact.

15 Claims, 6 Drawing Sheets

(56) References Cited

U.S. PATENT DOCUMENTS

| | | | |
|---|---|---|---|
| 2005/0055405 A1* | 3/2005 | Kaminsky | H04L 51/04 709/206 |
| 2005/0222890 A1* | 10/2005 | Cheng | G06Q 10/109 705/7.19 |
| 2006/0168016 A1* | 7/2006 | Barrett | G06Q 10/107 709/206 |
| 2006/0195379 A1* | 8/2006 | Abecassis | G06Q 30/02 705/35 |
| 2008/0059649 A1* | 3/2008 | Bradley | G06Q 10/109 709/232 |
| 2008/0086530 A1* | 4/2008 | Gandhi | G06Q 10/107 709/206 |
| 2008/0270939 A1* | 10/2008 | Mueller | G06F 3/04817 715/811 |
| 2009/0113001 A1* | 4/2009 | Manning | G06Q 10/107 709/206 |
| 2009/0204676 A1 | 8/2009 | Parkinson et al. | |
| 2009/0248819 A1* | 10/2009 | Hutchison | H04L 51/00 709/206 |
| 2009/0299808 A1 | 12/2009 | Gilmour et al. | |
| 2010/0161636 A1* | 6/2010 | Macwan | H04L 51/063 707/758 |
| 2011/0034182 A1* | 2/2011 | Issa | H04L 67/104 455/456.3 |
| 2011/0060796 A1* | 3/2011 | Grigsby | G06Q 10/107 709/206 |
| 2011/0126126 A1* | 5/2011 | Blair | G06Q 10/107 715/752 |
| 2012/0036196 A1* | 2/2012 | Patel | G06Q 10/107 709/206 |
| 2012/0072519 A1* | 3/2012 | Oda | G06Q 10/107 709/206 |
| 2012/0102122 A1* | 4/2012 | Byrnes | G06Q 10/107 709/206 |
| 2012/0143806 A1* | 6/2012 | Sundelin | G06N 20/00 706/21 |
| 2013/0024795 A1* | 1/2013 | Robotham | G06F 3/0486 715/769 |
| 2013/0159425 A1* | 6/2013 | Hogan | G06Q 10/107 709/206 |
| 2013/0290436 A1* | 10/2013 | Martin | G06Q 10/107 709/206 |
| 2014/0194151 A1* | 7/2014 | Bengtsson | H04L 51/04 455/466 |
| 2015/0312197 A1* | 10/2015 | Dong | H04L 51/28 715/752 |
| 2018/0302363 A1* | 10/2018 | Abedini | H04W 4/02 |

\* cited by examiner

SYSTEM AND METHOD FOR VISUAL CLASSIFICATION OF EMAIL PARTICIPANTS

BACKGROUND

Electronic messages (e.g., email) may be a useful part of work and leisure. The ability to send a single message to many people at once may be additionally useful. However, people may be included as recipient contacts for content they should not see. This may be potentially embarrassing for them in personal situations, and damaging in business and enterprise settings. While emails show the direct recipients of emails by address or nickname in various fields (e.g., the "To", "Cc", "Bcc"), it is up to the sender to verify that the right people are receiving the email and that the content (as well as the content of any attached thread) is appropriate. With many emails sent with multiple recipients every day, it may be cumbersome and arduous to scan over the recipient list and/or look up each recipient with whom they are not familiar to ensure they are not copying unintended people.

BRIEF SUMMARY OF DISCLOSURE

In one example implementation, a method, performed by one or more computing devices, may include but is not limited to generating, by a computing device, an electronic message. While authoring the electronic message, a contact shown in the electronic message may be identified that will receive the electronic message when the electronic message is sent. The contact may be associated with a classification based upon, at least in part, one or more attributes of the contact. A visual indication associated with the contact may be displayed based upon, at least in part, the classification of the contact, wherein the visual indication associated with the contact may be displayed while authoring the electronic message and before the electronic message is sent to the contact.

One or more of the following example features may be included. The visual indication may be a color associated with how a name of the contact is displayed in the electronic message. The visual indication may be a color associated with how an object is displayed in the electronic message, wherein the object, when selected, may send the electronic message to the contact. The classification may include, at least in part, a background of the contact. The classification may include, at least in part, a position of the contact in a hierarchy. The classification may include, at least in part, a threshold number of electronic messages previously sent to the contact. The visual indication may be a visual relationship between at least one of an author of the electronic message and at least one other contact shown in the electronic message that will receive the electronic message when the electronic message is sent.

In another example implementation, a computing system includes a processor and a memory configured to perform operations that may include but are not limited to generating an electronic message. While authoring the electronic message, a contact shown in the electronic message may be identified that will receive the electronic message when the electronic message is sent. The contact may be associated with a classification based upon, at least in part, one or more attributes of the contact. A visual indication associated with the contact may be displayed based upon, at least in part, the classification of the contact, wherein the visual indication associated with the contact may be displayed while authoring the electronic message and before the electronic message is sent to the contact.

One or more of the following example features may be included. The visual indication may be a color associated with how a name of the contact is displayed in the electronic message. The visual indication may be a color associated with how an object is displayed in the electronic message, wherein the object, when selected, may send the electronic message to the contact. The classification may include, at least in part, a background of the contact. The classification may include, at least in part, a position of the contact in a hierarchy. The classification may include, at least in part, a threshold number of electronic messages previously sent to the contact. The visual indication may be a visual relationship between at least one of an author of the electronic message and at least one other contact shown in the electronic message that will receive the electronic message when the electronic message is sent.

In another example implementation, a computer program product resides on a computer readable storage medium that has a plurality of instructions stored on it. When executed by a processor, the instructions cause the processor to perform operations that may include but are not limited to generating an electronic message. While authoring the electronic message, a contact shown in the electronic message may be identified that will receive the electronic message when the electronic message is sent. The contact may be associated with a classification based upon, at least in part, one or more attributes of the contact. A visual indication associated with the contact may be displayed based upon, at least in part, the classification of the contact, wherein the visual indication associated with the contact may be displayed while authoring the electronic message and before the electronic message is sent to the contact.

One or more of the following example features may be included. The visual indication may be a color associated with how a name of the contact is displayed in the electronic message. The visual indication may be a color associated with how an object is displayed in the electronic message, wherein the object, when selected, may send the electronic message to the contact. The classification may include, at least in part, a background of the contact. The classification may include, at least in part, a position of the contact in a hierarchy. The classification may include, at least in part, a threshold number of electronic messages previously sent to the contact. The visual indication may be a visual relationship between at least one of an author of the electronic message and at least one other contact shown in the electronic message that will receive the electronic message when the electronic message is sent.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
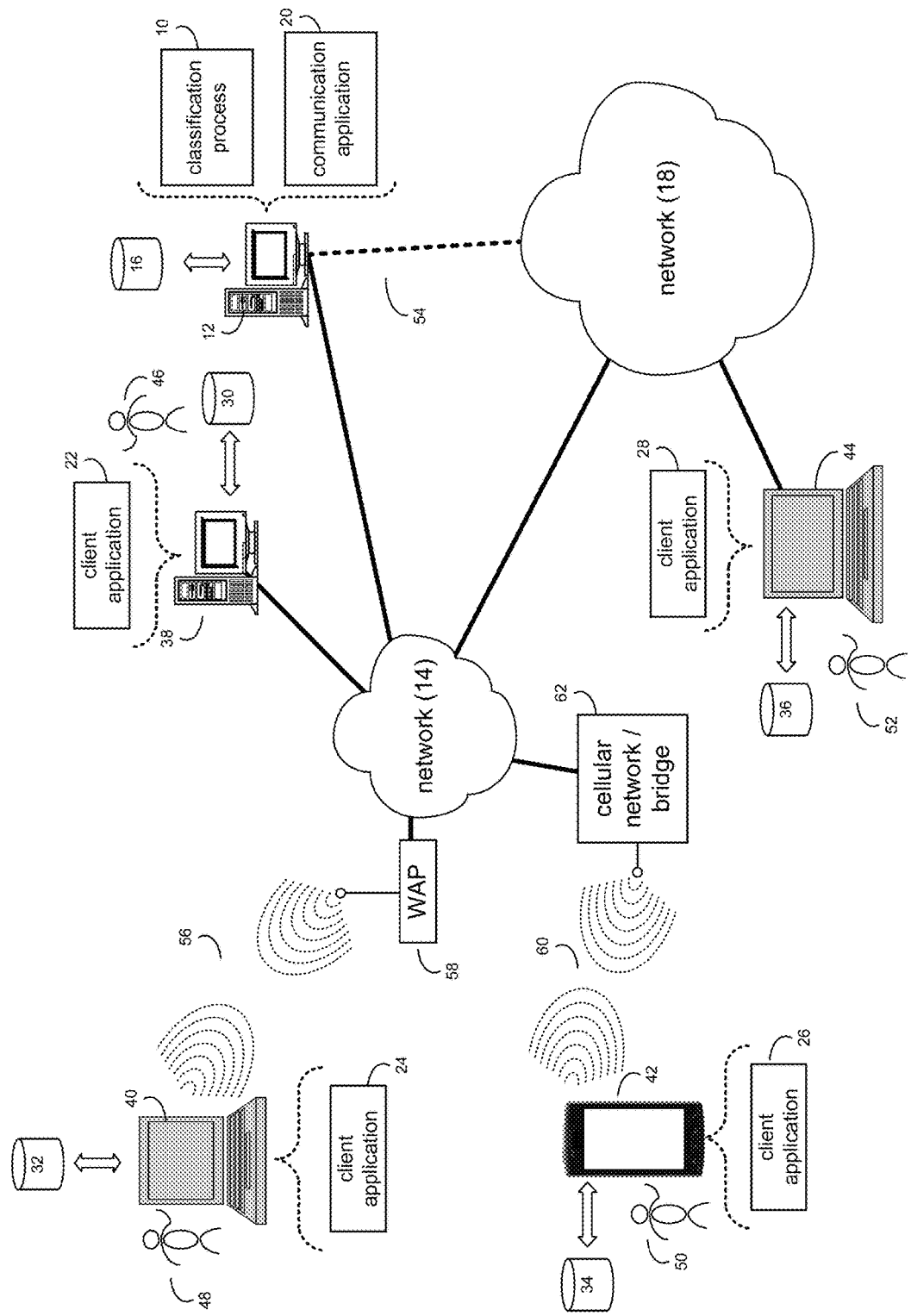
FIG. 1 is an example diagrammatic view of a classification process coupled to a distributed computing network according to one or more example implementations of the disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown classification process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, classification process 10 may generate, by a computing device, an electronic message. While authoring the electronic message, a contact shown in the electronic message may be identified that will receive the electronic message when the electronic message is sent. The contact may be associated with a classification based upon, at least in part, one or more attributes of the contact. A visual indication associated with the contact may be displayed based upon, at least in part, the classification of the contact, wherein the visual indication associated with the contact may be displayed while authoring the electronic message and before the electronic message is sent to the contact.

The instruction sets and subroutines of classification process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Classification process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a communication application (e.g., communication application 20), examples of which may include, but are not limited to, e.g., an email client application, an Instant Messaging (IM)/"chat" application, short messaging service (SMS)/multimedia messaging service (MMS) application, blogging application, social media posting application, or other application that allows for sending an electronic message to one or more recipients simultaneously. Classification process 10 and/or communication application 20 may be accessed via client applications 22, 24, 26, 28. Classification process 10 may be a stand alone application, or may be an applet/application/script/extension that may interact with and/or be executed within communication application 20, a component of communication application 20, and/or one or more of client applications 22, 24, 26, 28. Communication application 20 may be a stand alone application, or may be an applet/application/script/extension that may interact with and/or be executed within classification process 10, a component of classification process 10, and/or one or more of client applications 22, 24, 26, 28. One or more of client applications 22, 24, 26, 28 may be a stand alone application, or may be an applet/application/script/extension that may interact with and/or be executed within and/or be a component of classification process 10 and/or communication application 20. Examples of client applications 22, 24, 26, 28 may include, but are not limited to, e.g., an email client application, an Instant Messaging (IM)/"chat" application, short messaging service (SMS)/multimedia messaging service (MMS) application, blogging application, social media posting application, or other application that allows for sending an electronic message to one or more recipients simultaneously, a standard and/or mobile web browser, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of classification process 10 (and vice versa). Accordingly, classification process 10 may be a purely server-side application, a purely client-side application, or a hybrid server-side/client-side application that is cooperatively executed by one or more of client applications 22, 24, 26, 28 and/or classification process 10.

One or more of client applications 22, 24, 26, 28 may be configured to effectuate some or all of the functionality of communication application 20 (and vice versa). Accordingly, communication application 20 may be a purely server-side application, a purely client-side application, or a hybrid server-side/client-side application that is cooperatively executed by one or more of client applications 22, 24, 26, 28 and/or communication application 20. As one or more of client applications 22, 24, 26, 28, classification process 10, and communication application 20, taken singly or in any combination, may effectuate some or all of the same functionality, any description of effectuating such functionality via one or more of client applications 22, 24, 26, 28, classification process 10, communication application 20, or combination thereof, and any described interaction(s) between one or more of client applications 22, 24, 26, 28, classification process 10, communication application 20, or combination thereof to effectuate such functionality, should be taken as an example only and not to limit the scope of the disclosure.

Users 46, 48, 50, 52 may access computer 12 and classification process 10 (e.g., using one or more of client electronic devices 38, 40, 42, 44) directly through network 14 or through secondary network 18. Further, computer 12 may be connected to network 14 through secondary network 18, as illustrated with phantom link line 54. Classification process 10 may include one or more user interfaces, such as browsers and textual or graphical user interfaces, through which users 46, 48, 50, 52 may access classification process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
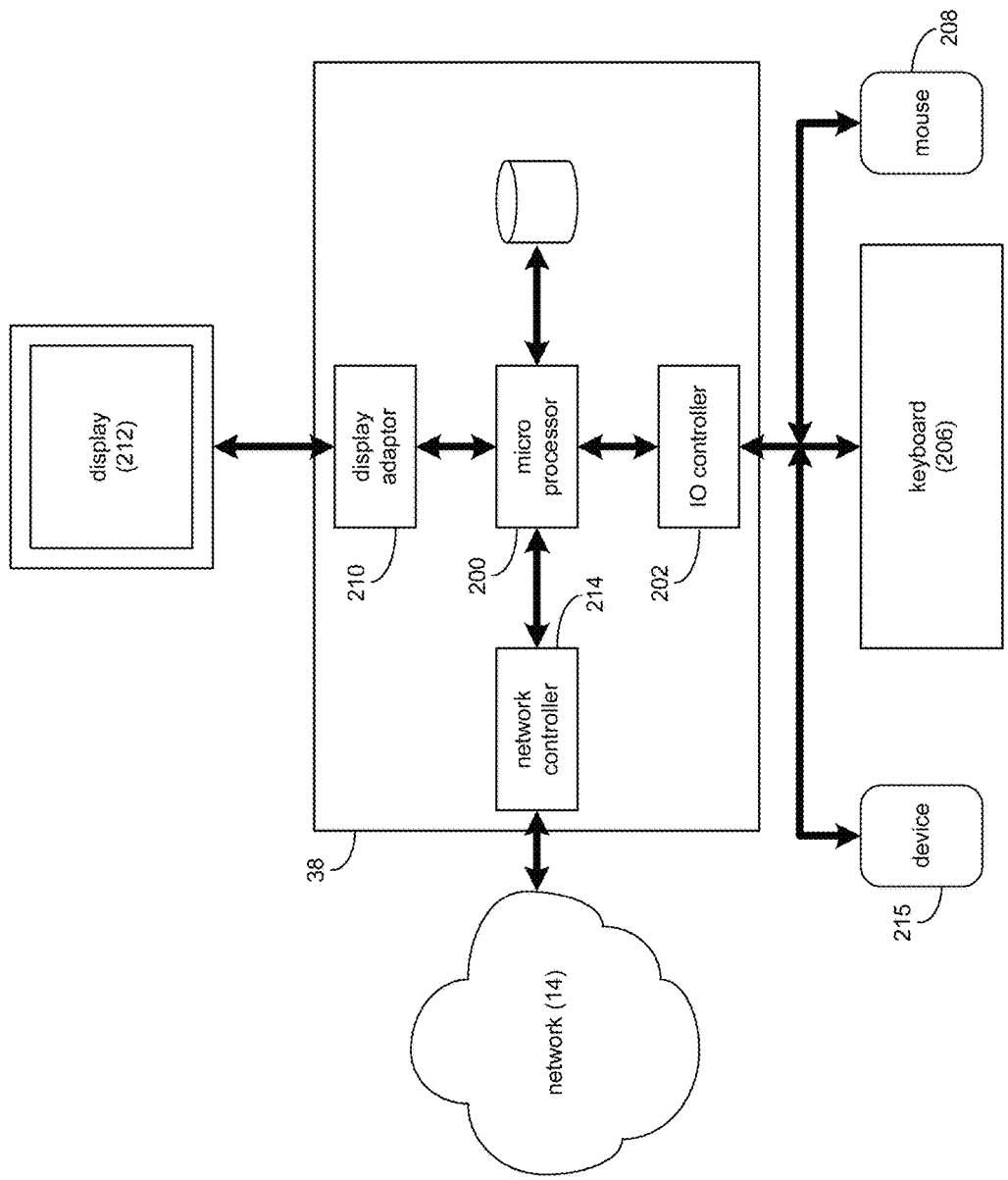
FIG. 2 is an example diagrammatic view of a client electronic device of FIG. 1 according to one or more example implementations of the disclosure.
Figure 3:
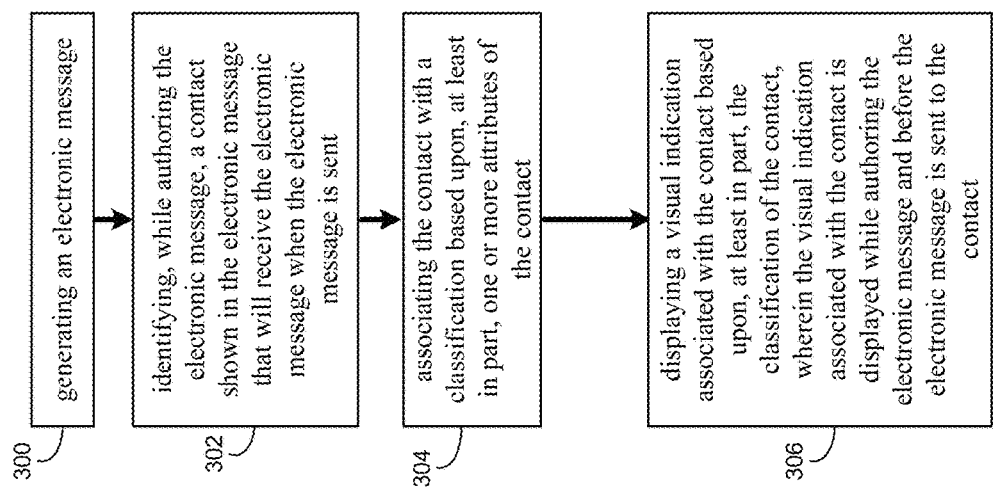
FIG. 3 is an example flowchart of the classification process of FIG. 1 according to one or more example implementations of the disclosure.
Figure 4:
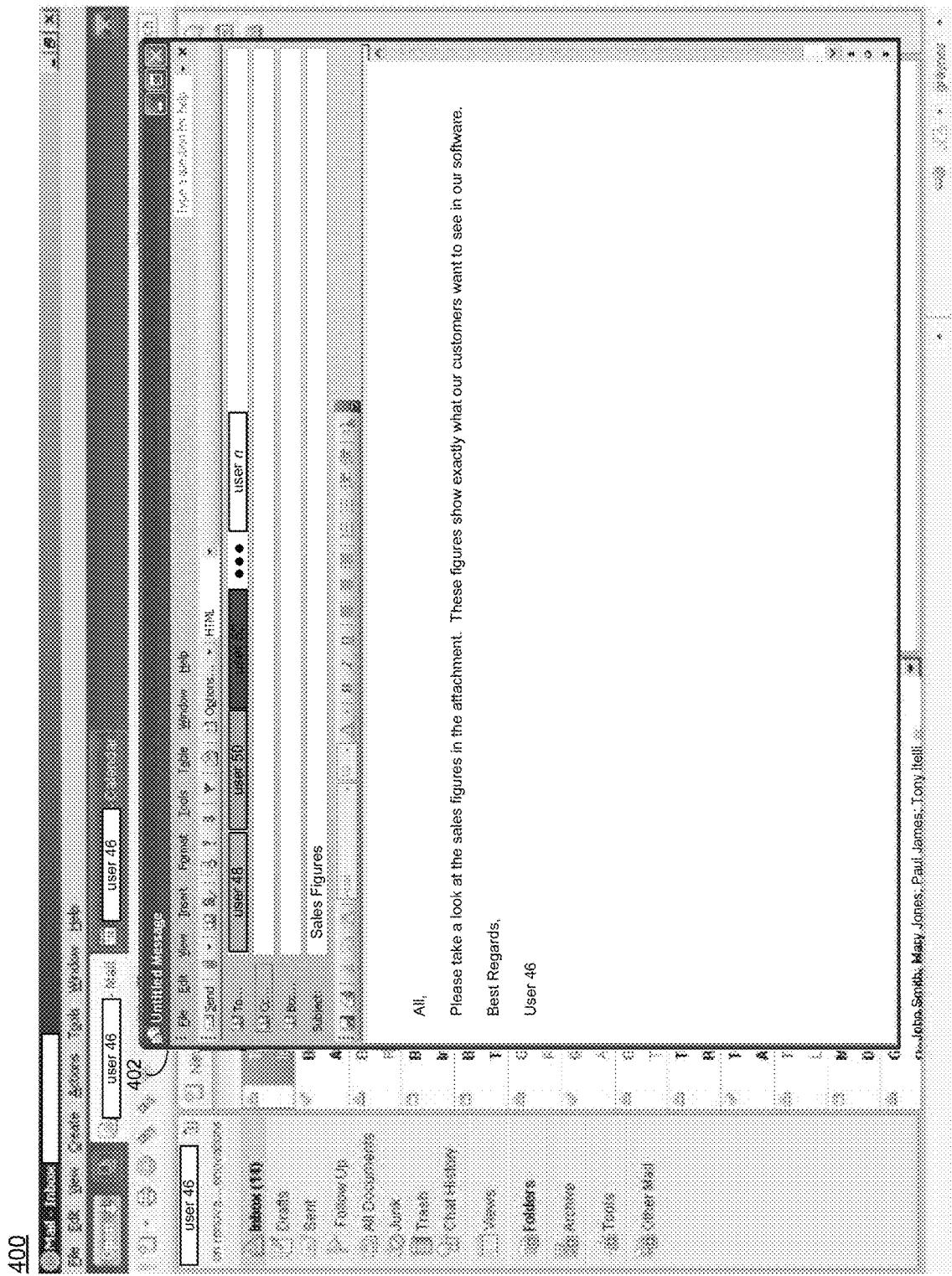
FIG. 4 is an example diagrammatic view of a screen image displayed by the classification process of FIG. 1 according to one or more example implementations of the disclosure.
Figure 5:
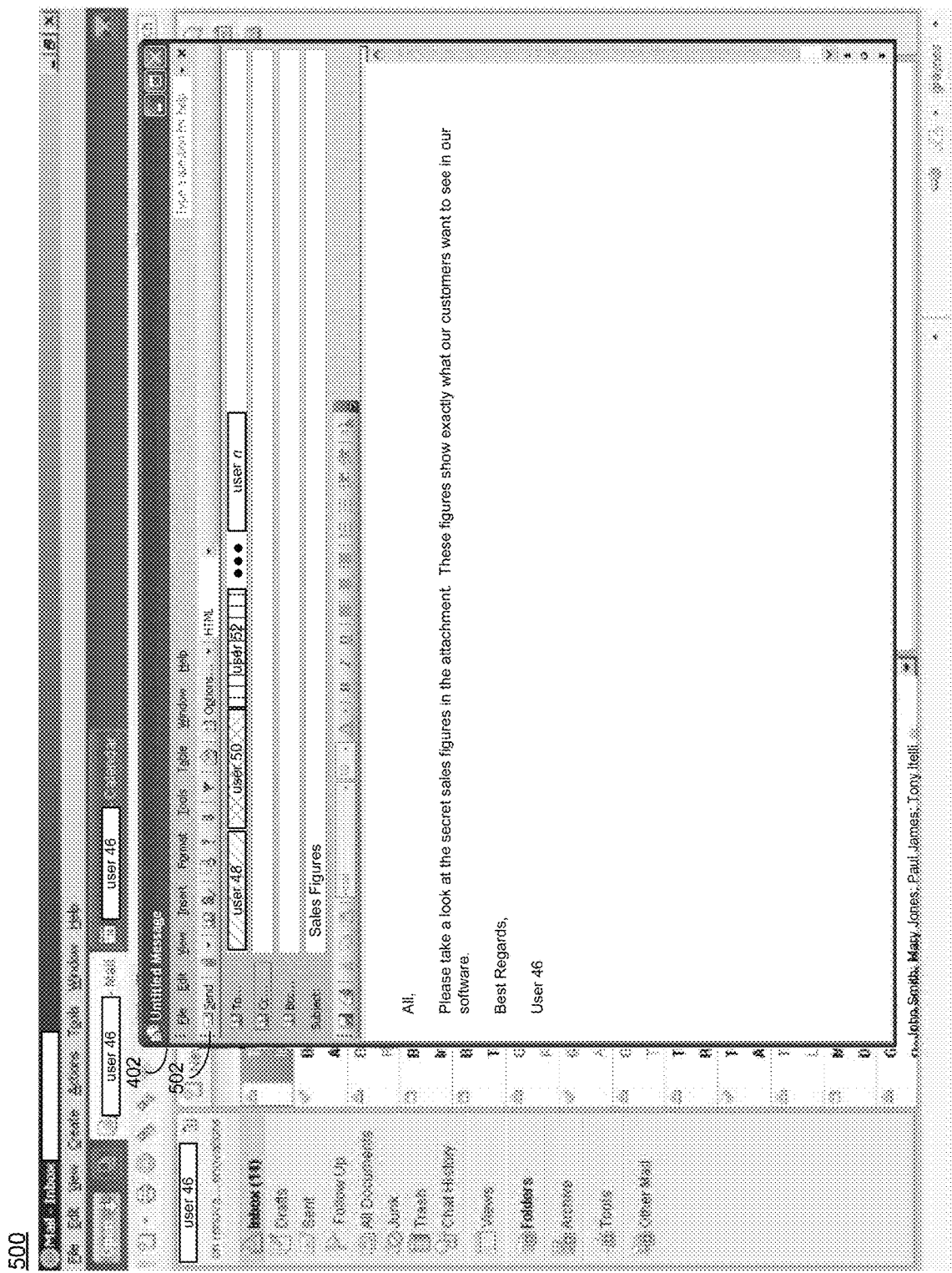
FIG. 5 is an example diagrammatic view of a screen image displayed by the classification process of FIG. 1 according to one or more example implementations of the disclosure.
Figure 6:
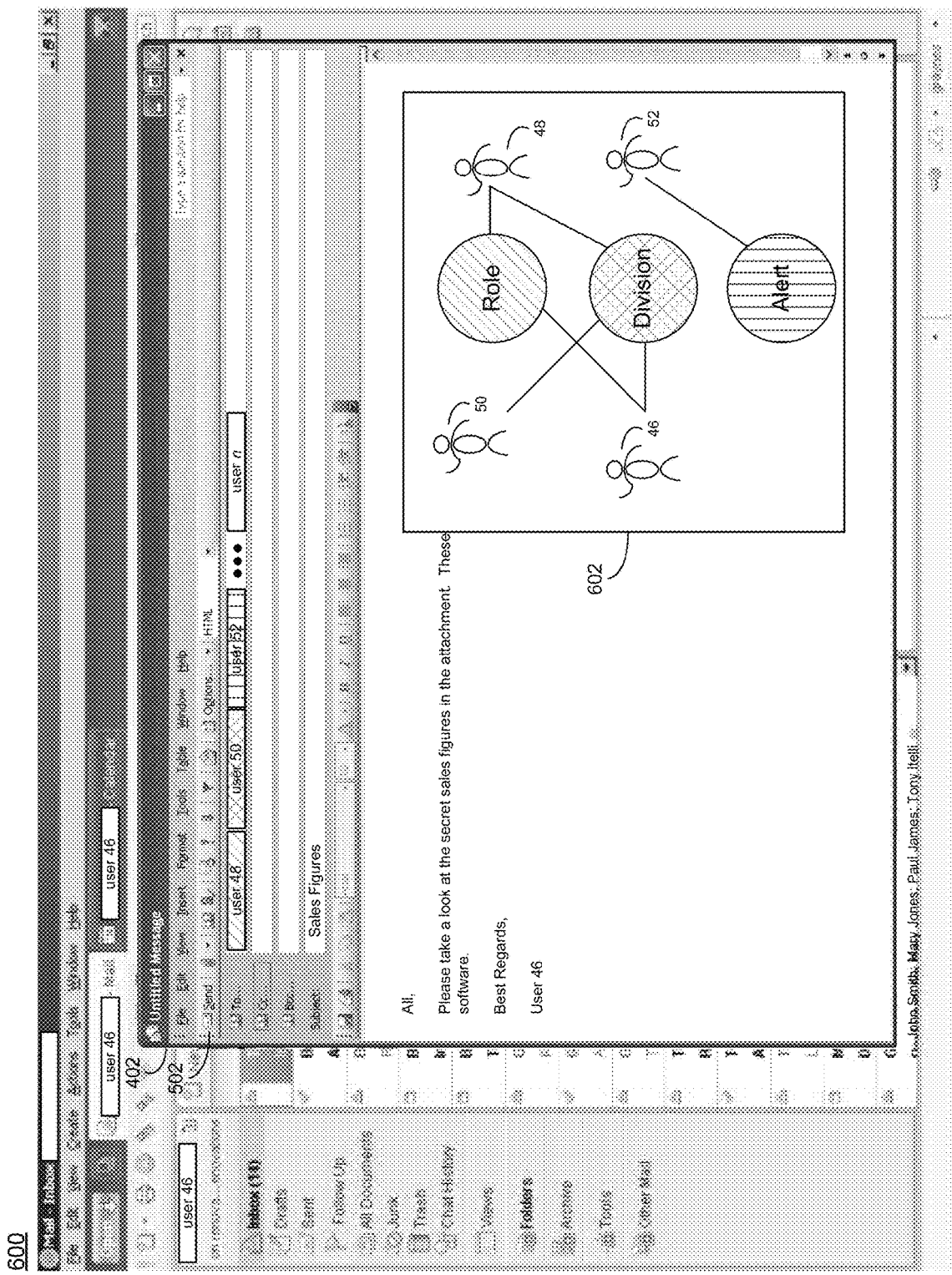
FIG. 6 is an example diagrammatic view of a screen image displayed by the classification process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, classification process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Classification Process:

As discussed above and referring also at least to FIGS. 3-6, classification process 10 may generate 300, by a computing device, an electronic message. While authoring the electronic message, a contact shown in the electronic message may be identified 302 by classification process 10 that will receive the electronic message when the electronic message is sent. Classification process 10 may associate 304 the contact with a classification based upon, at least in part, one or more attributes of the contact. A visual indication associated with the contact may be displayed 306 by classification process 10 based upon, at least in part, the classification of the contact, wherein the visual indication associated with the contact may be displayed while authoring the electronic message and before the electronic message is sent to the contact.

Electronic messages (e.g., email) may be a useful part of work and leisure. The ability to send a single message to many people at once may be additionally useful. However, people may be included as recipient contacts for content they should not see. This may be potentially embarrassing for them in personal situations, and damaging in business and enterprise settings. While emails show the direct recipients of emails by address or nickname in various fields (e.g., the "To", "Cc", "Bcc"), it is up to the sender to verify that the right people are receiving the email and that the content (as well as the content of any attached thread) is appropriate. With many emails sent with multiple recipients every day, it may be cumbersome and arduous to scan over the recipient list and/or look up each recipient with whom they are not familiar to ensure they are not copying unintended people.

As will be discussed in greater detail below, classification process 10 may inform senders of emails (before the email is sent), of the categorization of intended recipients of the email via some visual indication. This may ensure that all recipients are desirable and appropriate, which may prevent the inappropriate sending of content or sending of content inappropriate for select recipients. In some implementations, this type of visual indication may help not only save them time, but help users (that may be busy) respond quickly to missives, which might have numerous people as recipients with which the respondent is not familiar and may not have the time to research the recipient list. Classification process 10 may also help prevent accidental disclosure of information (e.g., proprietary or confidential information), and may allow a wider distribution of missives. In some implementations, the classification may enable the author of the email to remove a particular recipient from the distribution list, and/or amend the email to remove sensitive information before sending.

In some implementations, classification process 10 may generate 300, by a computing device, an electronic message. For example, and referring at least to FIG. 4, a user (e.g., user 46) may (via classification process 10, client application 22, communication application 20, or combination thereof) utilize an example user interface (e.g., UI 400) associated with classification process 10 to generate 300 an electronic message (e.g., email 402). While the example is shown with the electronic message being an email, it will be appreciated that any form of electronic communication (e.g., an Instant Messaging (IM)/"chat", short messaging service (SMS)/multimedia messaging service (MMS), blogging, social media posting, etc.) may be used without departing from the scope of the disclosure.

In some implementations, while authoring the electronic message (e.g., email 402), a contact shown in the electronic message may be identified 302 by classification process 10 that will receive the electronic message when the electronic message is sent. For example, as shown in the "To" field of email 402, one or more users are identified 302 by classification process 10 as contacts that will receive the email 402 when email 402 is sent. In the example, the users identified 302 may include, e.g., user 48, user 50, and user 52. It will be appreciated that one or more users may be identified 302 by classification process 10 that will receive the email 402 when email 402 is sent from other fields in email 402 (e.g., "Cc", "Bcc", etc.) without departing from the scope of the disclosure.

In some implementations, classification process 10 may associate 304 the contact with a classification based upon, at least in part, one or more attributes of the contact. For instance, a data store may include information (e.g., attributes) associated with each user. For example, this information may be retrieved by classification process 10 (e.g., using various APIs) from, e.g., email accounts, social media website profiles, company profiles, information manually entered into contact information associated with the contact, or any other location that may store information associated with each user. In the example, classification process 10 may use that information to associated 304 the contacts with a particular classification.

For instance, in some implementations, the classification may include, at least in part, a background of the contact. For example, the information may be used by classification process 10 to classify the contact based upon the contact's background. For instance, the information may include the job role/title attribute of the user, such that classification process 10 may associate 304 the contact with a job role classification (e.g., programmers, non-programmers, sales, corporate, division, brand, etc.). For instance, user 46 may wish to know which contacts in email 402 are outside of a particular division of a company, or are in a particular brand (e.g., user 46 may be in Industry Solutions and may want to know if there are any contacts in email 402 that are from Websphere, or if there are any contacts in email 402 that represent any particular brand, but may not be interested in any other divisional classification, like sales, or corporate). As another example, the information may include the band level attribute of the user, such that classification process 10 may associate 304 the contact with a band level classification (e.g., based upon a threshold number of band levels above user 46 the identified 302 contact is, etc.). As another example, the information may include the company attribute of the user, such that classification process 10 may associate 304 the contact with a company classification (e.g., based upon whether or not the identified 302 contact is in the same company/organization/group, department, division as user 46, etc.).

In some implementations, the classification may include, at least in part, a position of the contact in a hierarchy. For example, the information may be used by classification process 10 to classify the contact based upon the contact's position in a hierarchy (e.g., company hierarchy, organization hierarchy, etc.). For instance, the information may include the hierarchy attribute of the user, such that classification process 10 may associate 304 the contact with their hierarchical position classification (e.g., executive, manager, staff, as well as more fine grain hierarchical classification). For instance, user 46 may wish to know which contacts in email 402 are executives, such that the email may be proof read with finer detail.

In some implementations, the classification may include, at least in part, a threshold number of electronic messages previously sent to the contact. For example, the information may be used by classification process 10 to classify the contact based upon how many emails user 46 has previously sent to the contact (or received from the contact). For instance, the information may include the threshold number of sent/received email attribute of the user, such that classification process 10 may associate 304 the contact with their classification. For instance, user 46 may wish to know which contacts in email 402 have never previously received an email communication from user 46, or which contacts in email 402 have never previously sent an email communication to user 46. It will be appreciated that any threshold number (e.g., 0, 1, 2 . . . n) of sent/received emails may be used for the classification without departing from the scope of the disclosure.

In some implementation, the attributes used by classification process 10 for classification of the email contacts may be based upon, e.g., a default setting, a company profile, or manually selected by user 46 (e.g., via a menu provided by classification process 10) (not shown). It will be appreciated that any combination of the above-noted attributes may be used to classify the email contact without departing from the scope of the disclosure.

In some implementations, a visual indication associated with the contact may be displayed 306 by classification process 10 based upon, at least in part, the classification of the contact, wherein the visual indication associated with the contact may be displayed while authoring the electronic message and before the electronic message is sent to the contact. For instance, assume for example purposes only that user 46 is (via UI 400 of classification process 10), authoring email 402, which has not yet been sent. In the example, the contacts shown in email 402 identified 302 by classification process 10 that will receive email 402 when it is sent include user 48, user 50, and user 52. Further in the example, assume that user 48 is classified as an executive, user 50 is classified as being outside the division of user 46, and user 52 is classified as never having sent an email to user 46.

In some implementations, the visual indication may be a color associated with how a name of the contact is displayed in the electronic message. For instance, the font and/or background color listing user 48 in the "To" field may be a particular color (e.g., orange) based upon being classified as an executive; the font and/or background color listing user 50 in the "To" field may be a particular color (e.g., purple) based upon being outside the division of user 46; and the font and/or background color listing user 52 in the "To" field may be a particular color (e.g., red) based upon never having sent an email to user 46. It will be appreciated that other visual indications associated with how a name of the contact is displayed in email 402 without departing from the scope of the disclosure. For instance, and referring at least to UI 500 of FIG. 5, the font and/or background color listing user 48 in the "To" field may be a particular color (e.g., orange) and/or design (e.g., forward slashes) based upon being classified as an executive; the font and/or background color listing user 50 in the "To" field may be a particular color (e.g., purple) and/or design (e.g., checkered) based upon being outside the division of user 46; and the font and/or background color listing user 52 in the "To" field may be a particular color (e.g., red) and/or design (e.g., vertical stripes) based upon never having sent an email to user 46. Other non-limiting example visual indications associated with how a name of the contact is displayed in email 402 may include, e.g., bold/italicized names, various fonts and sizes, flags or other objects (e.g., stars, exclamation points, etc.) near the contact, etc. In some implementations, the visual indications associated with how a name of the contact is displayed in email 402 may be displayed 306 after a pointing device (e.g., mouse cursor) hovers over a particular contact.

In some implementations, the color classification may be based upon a generalized color coding scheme. For example, the colors may be used to indicate the relation to user 46 in terms of division. For instance, the color green may be used to indicate that the contact has the same job title as user 46 (e.g., software developer), the color yellow may be used to indicate that the contact is in the same division but with a different job title (e.g., in software development sales but not a software developer), and red may be used to indicate that the contact is "in management" or a "vice president". As another example, the color green may be used to indicate that the contact is "safe" to receive the email, the color yellow may be used to indicate that the contact is "questionable" as to whether or not they should receive the email or may want to be careful around (and may require further investigation by user 46 before sending the email), and red may be used to indicate that the contact is "not safe" (e.g., on a blocked list or identified as spam/phishing email, or identified as a competitor) to receive the email. In some implementations, if a recipient is classified as "not safe" (or any other classification as discussed above), classification process 10 may disable the ability to send email 402. For instance, classification process 10 may "grey out" the send button object, or may provide a visual warning message (e.g., popup message) indicating that a "not safe" contact is a recipient, and may require user 46 to confirm whether or not email 402 should be sent anyway or amended before sending. In some implementations, classification process 10 may parse content of message and use keywords to identify that user 46 may want to reconsider sending the email to one or more recipients. For instance, the term "secret" and/or "sales figures" (or other predetermined keywords) may be identified in the email body by classification process 10 as words that may indicate that user 46 may want to reconsider sending the email to one or more recipients (e.g., a yellow or red colored recipient).

In some implementations, a length of an email may trigger the above-noted warning message. For example, user 46 may not want to send a long email to an executive, and may want to instead send a more concise and pithy email so as not to waste the executive's time. In the example, based upon the classification of user 48 as an executive, classification process 10 may determine the number of words/characters or lines in email 402, and if a threshold number of words/characters/lines are reached, the above-noted warning message indicating the reason for the warning message may be displayed and/or the email may be prevented from being sent. In some implementations, the warning message may provide suggestions how to proceed (e.g., shorten the email, bulletize the email contents, remove a particular user, etc.).

In some implementations, the visual indication may be a color associated with how an object is displayed in the electronic message, wherein the object, when selected, may send the electronic message to the contact. For example, the above-noted color/pattern scheme may similarly be applied to the "send" button 502 of email 402. For instance, send (object) button 502 may be colored green to indicate that at least one contact is "safe" to receive the email, send (object) button 502 may be colored yellow to indicate that at least one contact is "questionable" as to whether or not they should receive the email or may want to be careful around (and may require further investigation by user 46 before sending the email), and send (object) button 502 may be colored red to indicate that at least one contact is "not safe" (e.g., on a blocked list or identified as spam/phishing email, or identified as a competitor) to receive the email. It will be appreciated that any other objects proximate or not proximate to send button 502 may be color/pattern coded to display 306 a visual indication of the classification of one or more contacts in email 306 without departing from the scope of the disclosure. For instance, the "To" object may change color. As another example, the background of the body of the message may change color. As such, the particular example of one or more objects changing color should be taken as example only and not to limit the scope of the disclosure, as any objects shown (or not shown) in UI 400/500 may be used to change color.

In some implementations, the visual indication may be a visual relationship between at least one of an author of the electronic message and at least one other contact shown in the electronic message that will receive the electronic message when the electronic message is sent. For example, and referring at least to FIG. 6, an example user interface (e.g., UI 600 of classification process 10) is shown. In the example, a visual relationship (shown by example only as popup 602) between user 46 and one or more contacts (and/or between each contact) may be displayed by classification process 10. For example, popup 602 may be displayed at any time (e.g., or as a result of hovering a pointing device cursor over a contact), which visualizes the relationship between user 46 and one or more contacts (and/or between each contact). For instance, popup 602 may display multiple objects that indicate one or more of the above-noted classifications (e.g., role, division, red coded/alert, etc.) and may connect a line or other object to the classification. As a result, a visual relationship between user 46 and one or more contacts (and/or between each contact) may be displayed by classification process 10. It will be appreciated that other example relationships may be displayed without departing from the scope of the disclosure. For instance, popup 602 may display multiple objects that indicate how each recipient contact is connected with each other (e.g., via social network, business contact, etc.). As such, the visual relationship and design shown in popup 602 should be taken as an example only.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying a recipient contact of an electronic message during composition of the electronic message;
   retrieving attribute information of the recipient contact from an email account, a social media profile, a company profile, a manual entry, and stored information associated with the contact, wherein the attribute information includes a job role attribute and a job title attribute of the recipient contact, a band level attribute of the recipient contact, and a company attribute of the recipient contact,
   classifying the recipient contact based on the one or more retrieved attributes of the recipient contact, wherein classifying the recipient contact comprises:
      comparing the job role attribute and the job title attribute of the recipient contact with a job role and a job title of an author of the electronic message;
      associating the recipient contact with a job role classification based on the comparison between the job role attribute and the job title attribute of the recipient contact and the job role and the job title of the author;
      comparing the band level attribute of the recipient contact with a band level of the author;
      associating the recipient contact with a band level classification based on the comparison between the band level attribute of the recipient contact and the band level of the author;
      comparing the company attribute of the recipient contact with a company of the author;
      associating the recipient contact with a company classification based on the comparison between the company attribute of the recipient contact and the company of the author;
   highlighting the recipient contact's name displayed in a "To" field of the electronic message, wherein the highlighting comprises a color-coded hatched pattern corresponding to the classification of the recipient contact, wherein unique colors and unique hatched patterns are assigned to each of the job role classification, the band level classification, and the company classification; and
   disabling the ability to send the electronic message and providing a visual warning message based upon a length of the electronic message exceeding a predetermined length associated with the classification of the recipient contact, wherein the visual warning message comprises a reason for displaying the visual warning message and suggestions on how to modify the electronic message prior to sending based on the reason for displaying the visual warning message.

2. The computer-implemented method of claim 1, wherein classifying the recipient contact comprises:
   determining a position of the recipient contact in a hierarchy.

3. The computer-implemented method of claim 1, wherein classifying the recipient contact comprises:
   determining a number of electronic messages previously sent to the recipient contact exceeded a threshold number.

4. The computer-implemented method of claim 1, wherein displaying the visual warning further comprises:
   highlighting a send button with one of three colors, a first color indicating the recipient contact is safe to receive the electronic message, a second color indicating the recipient contact is questionable to receive the electronic message, and a third color indicating the recipient contact is not safe to receive the electronic message.

5. The computer-implemented method of claim 1, further comprising:
   displaying a relationship between the author of the electronic message and the recipient contact in a popup window in response to the author hovering a pointing device over the recipient contact's name.

6. A computer-implemented method comprising:
   identifying a recipient contact of an electronic message during composition of the electronic message;
   retrieving attribute information of the recipient contact from an email account, a social media profile, a company profile, a manual entry, and stored information associated with the contact,
      wherein the attribute information includes a job role attribute and a job title attribute of the recipient contact, a band level attribute of the recipient contact, and a company attribute of the recipient contact,
   classifying the recipient contact based on the one or more retrieved attributes of the recipient contact, wherein classifying the recipient contact comprises:

comparing the job role attribute and the job title attribute of the recipient contact with a job role and a job title of an author of the electronic message;
associating the recipient contact with a job role classification based on the comparison between the job role attribute and the job title attribute of the recipient contact and the job role and the job title of the author, wherein the job role classification indicates whether the recipient contact has a different job role than the author;
comparing the band level attribute of the recipient contact with a band level of the author;
associating the recipient contact with a band level classification based on the comparison between the band level attribute of the recipient contact and the band level of the author, wherein the band level classification indicates whether the recipient contact works for a different division than the author;
comparing the company attribute of the recipient contact with a company of the author;
associating the recipient contact with a company classification based on the comparison between the company attribute of the recipient contact and the company of the author, wherein the company classification indicates whether the recipient contact works for a different company than the author;
highlighting the recipient contact's name displayed in a "To" field of the electronic message, wherein the highlighting comprises a color-coded hatched pattern corresponding to the classification of the recipient contact, wherein unique colors and unique hatched patterns are assigned to each of the job role classification, the band level classification, and the company classification; and
disabling the ability to send the electronic message and providing a visual warning message based upon a length of the electronic message exceeding a predetermined length associated with the classification of the recipient contact, wherein the visual warning message comprises a reason for displaying the visual warning message and suggestions on how to modify the electronic message prior to sending based on the reason for displaying the visual warning message.

7. The computer-implemented method of claim 6, wherein classifying the recipient contact comprises:
determining a position of the recipient contact in a hierarchy.

8. The computer-implemented method of claim 6, wherein classifying the recipient contact comprises:
determining a number of electronic messages previously sent to the recipient contact exceeded a threshold number.

9. The computer-implemented method of claim 6, wherein displaying the visual warning further comprises:
highlighting a send button with one of three colors, a first color indicating the recipient contact is safe to receive the electronic message, a second color indicating the recipient contact is questionable to receive the electronic message, and a third color indicating the recipient contact is not safe to receive the electronic message.

10. The computer-implemented method of claim 6, further comprising:
displaying a relationship between the author of the electronic message and the recipient contact in a popup window in response to the author hovering a pointing device over the recipient contact's name.

11. A computer-implemented method comprising:
identifying a recipient contact of an electronic message during composition of the electronic message;
retrieving attribute information of the recipient contact from an email account, a social media profile, a company profile, a manual entry, and stored information associated with the contact,
wherein the attribute information includes a job role attribute and a job title attribute of the recipient contact, a band level attribute of the recipient contact, and a company attribute of the recipient contact,
classifying the recipient contact based on the one or more retrieved attributes of the recipient contact, wherein classifying the recipient contact comprises:
comparing the job role attribute and the job title attribute of the recipient contact with a job role and a job title of an author of the electronic message;
associating the recipient contact with a job role classification based on the comparison between the job role attribute and the job title attribute of the recipient contact and the job role and the job title of the author, wherein the job role classification indicates whether the recipient contact has a different job role than the author;
comparing the band level attribute of the recipient contact with a band level of the author;
associating the recipient contact with a band level classification based on the comparison between the band level attribute of the recipient contact and the band level of the author, wherein the band level classification indicates whether the recipient contact works for a different division than the author;
comparing the company attribute of the recipient contact with a company of the author;
associating the recipient contact with a company classification based on the comparison between the company attribute of the recipient contact and the company of the author, wherein the company classification indicates whether the recipient contact works for a different company than the author;
highlighting the recipient contact's name displayed in a "To" field of the electronic message, wherein the highlighting comprises a color-coded hatched pattern corresponding to the classification of the recipient contact, wherein unique colors and unique hatched patterns are assigned to each of the job role classification, the band level classification, and the company classification;
displaying a relationship between the author of the electronic message and the recipient contact in a popup window, wherein an object representing the recipient contact is highlighted with the same color-coded hatched pattern used to highlight the recipient contact's name in the "To" field of the electronic message; and
disabling the ability to send the electronic message and providing a visual warning message based upon a length of the electronic message exceeding a predetermined length associated with the classification of the recipient contact, wherein the visual warning message comprises a reason for displaying the visual warning message and suggestions on how to modify the electronic message prior to sending based on the reason for displaying the visual warning message.

12. The computer-implemented method of claim 11, wherein classifying the recipient contact comprises:
determining a position of the recipient contact in a hierarchy.

13. The computer-implemented method of claim 11, wherein classifying the recipient contact comprises:

determining a number of electronic messages previously sent to the recipient contact exceeded a threshold number.

14. The computer-implemented method of claim 11, wherein displaying the visual warning further comprises:
highlighting a send button with one of three colors, a first color indicating the recipient contact is safe to receive the electronic message, a second color indicating the recipient contact is questionable to receive the electronic message, and a third color indicating the recipient contact is not safe to receive the electronic message.

15. The computer-implemented method of claim 11, wherein displaying the relationship comprises:
displaying the relationship in response to the author hovering a pointing device over the recipient contact's name.

* * * * *